US00RE35021E

United States Patent [19]

Englund et al.

[11] E Patent Number: Re. 35,021

[45] Reissued Date of Patent: Aug. 22, 1995

[54] COMPOUNDING, GLAZING OR POLISHING PAD

[75] Inventors: Richard L. Englund, Maplewood, Minn.; Thomas W. Schwartz, Troy Township, St. Croix County, Wis.

[73] Assignee: Minnesota Mining and Manufacturing Company, St. Paul, Minn.

[21] Appl. No.: 962,311

[22] Filed: Oct. 16, 1992

Related U.S. Patent Documents

Reissue of:

[64] Patent No.: 4,962,562
Issued: Oct. 16, 1990
Appl. No.: 298,508
Filed: Jan. 18, 1989

[51] Int. Cl.[6] ..... B24B 29/00

[52] U.S. Cl. ..... 15/230.16; 15/97.1; 15/230; 15/230.18; 451/530; 451/533

[58] Field of Search ..... 15/230, 230.1, 230.14, 15/230.16, 230.17, 230.18, 244.4, 97.1, 98; 51/394, 395, 398, 401; 427/429

[56] References Cited

U.S. PATENT DOCUMENTS

| | | | |
|---|---|---|---|
| 1,953,983 | 4/1934 | Brenner | 51/280 |
| 3,171,820 | 3/1965 | Volz | 260/2.5 |
| 3,346,904 | 10/1967 | Armstrong | 15/230 |
| 3,418,675 | 12/1968 | Meguiar et al. | 15/230 |
| 3,537,121 | 11/1970 | McAvoy | 15/230.12 |
| 4,182,616 | 1/1980 | Gadbois et al. | 51/295 |
| 4,343,112 | 8/1982 | Jarrett | 51/131.3 |
| 4,609,581 | 9/1986 | Ott | 428/100 |

FOREIGN PATENT DOCUMENTS

| | | |
|---|---|---|
| 0095015 | 11/1983 | European Pat. Off. . |
| 0196832 | 10/1986 | European Pat. Off. . |
| 1254735 | 1/1961 | France . |
| 3043044 | 6/1982 | Germany . |
| 56-126581 | 10/1981 | Japan . |
| 58-4361 | 1/1983 | Japan . |
| 990142 | 4/1965 | United Kingdom . |

*Primary Examiner*—Edward L. Roberts
*Attorney, Agent, or Firm*—Gary L. Griswold; Walter N. Kirn; William L. Huebsch

[57] ABSTRACT

A paint finishing pad adapted to be used on a drive assembly including a back up pad and a drive motor for rotating the back up pad. The paint finishing pad includes a layer of open cell polymeric foam having a front surface defined by a plurality of spaced projecting portions of the layer of foam, and loops projecting from a rear surface of the layer of foam for releasably attaching the paint finishing pad to a support surface on the back up pad.

28 Claims, 1 Drawing Sheet

Fig. 1
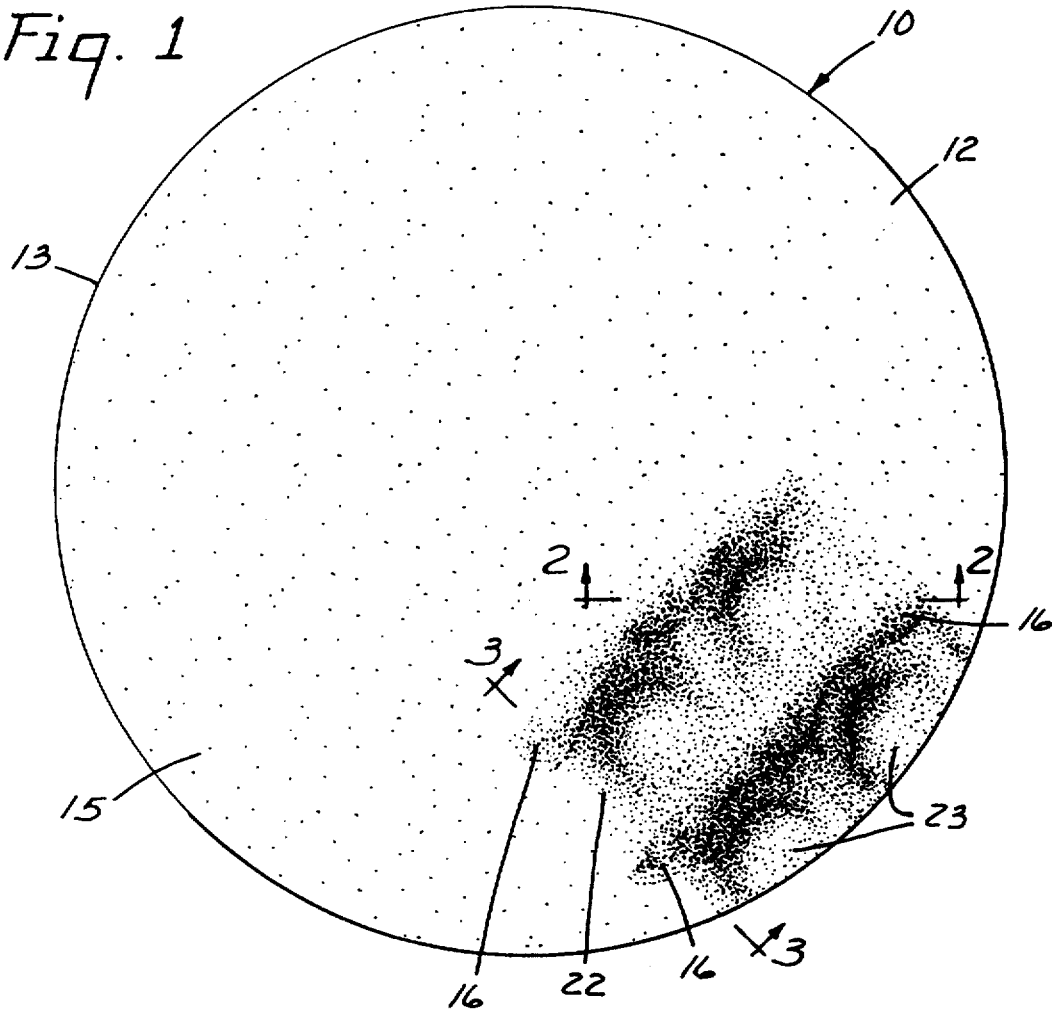
Fig. 2
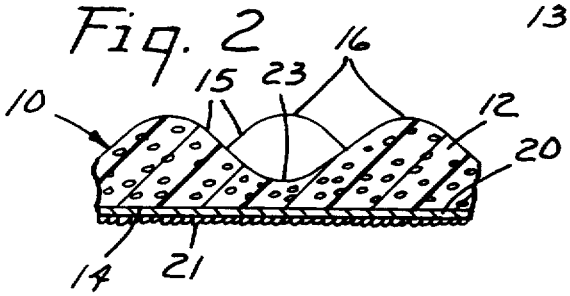
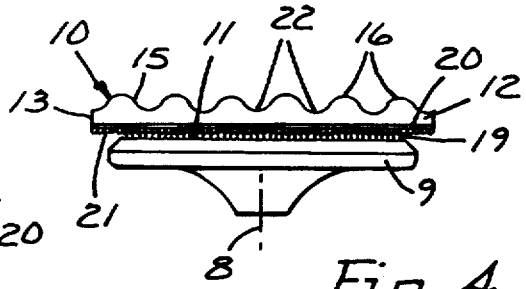
Fig. 4
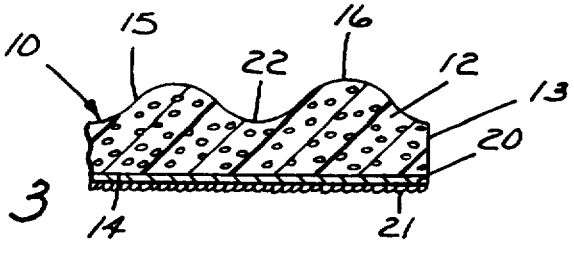
Fig. 3

COMPOUNDING, GLAZING OR POLISHING PAD

Matter enclosed in heavy brackets [ ] appears in the original patent but forms no part of this reissue specification; matter printed in italics indicates the additions made by reissue.

TECHNICAL FIELD

The present invention relates to pads used to finish the exposed surface of paint such as on automobiles.

BACKGROUND ART

Finishing the exposed surface of new paint such as on an automobile, (particularly paint of the type called BC/CC (basecoat/clearcoat) which is a two-part paint system and is commonly used in after market painting of automobiles but also including other types of paint), typically includes (1) initial color sanding which is done by hand using fine grit abrasive (e.g., 1200 to 1500 grit) that provides substantial smoothing or leveling of the paint surface but results in surface scratches from the abrasive grit; (2) one or more intermediate compounding operations in which a liquid or paste rubbing compound containing a finer abrasive is applied by a machine rotated compounding pad having tufts of all wool or a wool and synthetic fiber blend to remove the scratches that result from the color sanding operation, which compounding operation leaves swirl marks on the paint; (3) a machine gluing operation in which a glaze including a yet finer abrasive is applied using a glazing or polishing pad to remove the swirl marks, which machine glazing operation leaves wheel marks that are particularly noticeable on dark color paints; and (4) a final hand glazing operation in which a glaze including an even finer abrasive is applied by hand in an attempt to remove the wheel marks. Often, the hand glazing operation fills some of the wheel marks rather than removing them, so that after a short period of time or when the paint is subsequently washed, the fill in the wheel marks is removed and they can again be seen.

One type of pad commonly used for the machine gluing operation has tufts of a finer wool or wool blend than the compounding pad described above, while another type of pad used for the machine gluing operation is a foam pad (see U.S. Pat, No. 3,418,675) comprising a layer of open cell polymeric foam (e.g., two pound polyester urethane 5 centimeters (2 inches) thick and 15 or 20 centimeters (6 or 8 inches) in diameter) having a planar front surface by which the glaze is applied, and means for attaching a rear surface of the pad to a support surface on a back up pad of a drive unit, which, in at least one known foam pad, releasably attaches to the back up pad to facilitate changing foam pads. While such foam pads can be machine driven and used with commercially available glazes normally used for the hand glazing process (particularly including the glaze commercially identified as "IMPERIAL" machine glaze available from Minnesota Mining and Manufacturing Company (3M), St. Paul, Minn.) to remove wheel marks on test panels coated with black paint of the BC/CC type indicated above instead of using the hand glazing operation, such use of such foam pads presents several problems, including long working time apparently because of the low absorbency of the foam pads. Also, such foam pads have a tendency to sling glaze onto an adjacent area which may already have been finished. Build up of dried glaze on the surface of the foam pad can be deposited on the paint surface, resulting in a smear on that surface; and when the painted surface is almost dry and the final gloss is near, such foam pads have a tendency to grab the paint surface which causes vibration or chatter and operator fatigue.

DISCLOSURE OF THE INVENTION

The present invention provides a new foam pad for finishing the exposed surface of paint that can be machine driven and used with commercially available glazes normally used for the hand glazing process to remove wheel marks from the paint being finished instead of using the hand glazing operation, which new foam paint finishing pad, when compared to the foam pad described above, reduces slinging and working time, and greatly restricts smearing and the tendency of the new paint finishing pad to grab or chatter on the paint surface.

According to the present invention there is provided a paint finishing pad for finishing the surface of paint that is adapted to be used on a drive assembly including a back up pad having a generally planar support surface and a drive motor for moving the back up pad in a plane parallel to the support surface. The paint finishing pad comprises a layer of open cell polymeric foam (e.g., two pound polyester urethane foam) having a generally planar rear surface and an opposite front surface defined by a plurality of spaced projecting portions of the layer defining recess between the projecting portions; and attachment means attached to the rear surface for attaching the paint finishing pad to the support surface of the drive assembly, which attachment means preferably are releasable to afford changing paint finishing pads.

In a presently preferred embodiment, the layer of open cell foam is a commercially available foam available from Illbruck, Minneapolis, Minn. under the trade designation Standard Convoluted "SCOTFOAM" P-80 (a two pound reticulated open cell foam which has a compression deflection value of about 0.4 pounds per square inch when compressed twenty five percent and of about 0.65 pounds per square inch when compressed sixty five percent in accordance with the test procedure in ASTM D3574 as is indicated in publication No. FS1001 by Scotfoam Corporation, 1500 East Second Street, Eddystone, Penna. 19013, the content whereof is incorporated here by reference, *which published compression deflection values are generally midrange of the ranges of compression deflection values for the foam as manuafctured, which ranges are generally about 0.29 to 0.49 pounds per square inch when the foam is compressed twenty five percent and generally about 0.43 to 0.77 pounds per square inch when the foam is compressed sixty five percent in accordance with the test procedure in ASTM D3574*) in which foam the projecting portions are disposed in a regular rectangular or square array, the layer has ridge portions recessed a first distance from the distal ends of the projecting portions and extending between adjacent projecting portions, and the layer has a rectangular array of sockets recessed a second distance greater than (about twice) the first distance from the distal ends of the projecting portions, with each of the sockets being bounded by the ridges between four adjacent projecting portions; it being preferred that the projecting portions of the layer project more than about 0.64 centimeter (0.25 inch) beyond the recesses defined between the projecting portions (i.e., the second distance is more than about 0.64 centimeter (0.25 inch)).

BRIEF DESCRIPTION OF DRAWING

The present invention will be further described with reference to the accompanying drawing wherein like reference numerals refer to like parts in the several views, and wherein:

FIG. 1 is a front view of a first embodiment of a finishing pad according to the present invention for finishing the surface of paint;

FIG. 2 is a sectional view taken approximately along line 2—2 of FIG. 1;

FIG. 3 is a sectional view taken approximately along line 3—3 of FIG. 1; and FIG. 4 is a reduced side view of a combination of a back up pad from a drive assembly and the paint finishing pad shown in FIG. 1.

DETAILED DESCRIPTION

Referring now to the drawing, there is shown a paint finishing pad according to the present invention generally designated by the reference numeral 10.

The paint finishing pad 10 is adapted to be used on a rotary drive assembly including a generally planar circular support surface 11 on a back up pad 9 (e,g., preferably the back up pad available from Minnesota Mining and Manufacturing Company, St. Paul, Minn. (3M) under the trade designation "part no. 051131.05717 Backup Pad") rotatable by a motorized drive unit (e.g., a standard automotive type polisher adapted to rotate the back up pad 9 at a speed in the range of about 1200 to 3000 R.P.M. such as the single or variable speed electrically activated drive units available from Black and Decker Inc., Hunt Valley, Md, or the variable speed air pressure activated drive unit available from Chicago Pneumatic Tool Company, Utica, N.Y.) about a central axis 8 normal to the support surface 11. The paint finishing pad 10 comprises a layer 12 of open cell polymeric foam having a circular periphery 13 of a slightly larger diameter than the support surface 11 (e.g., the circular periphery 13 being about 20 centimeters (8 inches) in diameter, and the support surface 11 being about 17 centimeters (6.75 inches)in diameter), a generally planar rest surface 14, and an opposite front surface 15 defined by a plurality of spaced projecting portions 16 of the layer defining recess between the projecting portions 16; and means attached to the rear surface 14 for releasably attaching the paint finishing pad 10 to the support surface 11 of the back up pad 9 which as illustrated is an attachment layer 20 of material adhered to the rear surface 14 of the layer 12 of foam as by a hot melt adhesive or by flame laminating and having a plurality of projecting loops 21 adapted to be releasably engaged by projecting hooks 19 along the support surface 11 of the back up pad 9, which attachment layer 20 is porous and preferably made in the manner described in U.S. Pat. No. 4,609,581 (the content whereof is incorporated herein by reference) for placing loops 14 in a carrier web 12 of a structure described in that patent. Attachment of the attachment layer 20 of material to the layer 12 of foam by a porous web (e.g., 50 percent open area) of hot melt adhesive (e.g., "SHARNET" 4200, available from Sharnet Corp., Ward Hill, Mass.) or by flame laminating has been found to provide passageways between the attachment layer 20 and layer 12 of foam that afford passage of liquid therebetween to facilitates cleaning of the paint finishing pad 10.

As illustrated, the layer 12 of foam is a commercially available foam of the type available from Illbruck under the trade designation Standard Convoluted "SCOTFOAM" P-80 (a two pound reticulated open cell polyester urethane foam) in which foam, as illustrated, the projecting portions 16 are disposed in a regular rectangular or square array, the layer 12 has ridge portions 22 recessed a first distance from the distal ends of the projecting portions 16 and extending between adjacent projecting portions 16, and the layer 20 of foam has a rectangular array of sockets 23 recessed a second distance greater than the first distance from the distal ends of the projecting portions 16, with each of the sockets 23 being bounded by the ridge portions 2 between four adjacent projecting portions 16; it being preferred that the projecting portions 16 of the layer 20 of foam project more than about 0.64 centimeter (0.25 inch) beyond the recesses defined between the projecting portions 16 (i.e., the second distance is more than about 0.64 centimeter (0.25 inch)).

In use, the motorized drive unit (not shown) rotates the back up pad 9 about its axis 8 and/or reciprocates the back up pad 9 so that the paint finishing pad 10 is moved in a plane parallel to the support surface 11 of the back up pad 9 and can be used to glaze or polish a surface. If it is then desired to change the paint finishing pad 10 (e.g., because pores of the paint finishing pad 10 have become loaded with glaze) the paint finishing pad 10 can be stripped away from the support surface 11, and replaced with a fresh paint finishing pad.

Test Results

The following test was run to determine the effect of different size recesses in a paint finishing pad 10 of the type described above. Six test panels were first painted with black BC/CC paint of the type described above and then were sequentially hand sanded with "MICROFINE 1500" abrasive paper (available from 3M), compounded using "IMPERIAL" microfinish compound (available from 3M) applied with a part no 5701 double sided "SUPERBUFF" compounding pad (available from 3M), and glazed with "FINESSE-IT II" glazing compound (available from 3M) applied with a part no. 5705 "SUPERBUFF" glazing pad (available from 3M). Different ones of the panels were then again glazed with "IMPERIAL" hand glaze (a glaze available from 3M that is normally applied by hand) using different paint finishing pads 10 of the type described above in which the projecting portions 16 of the layer 20 of foam projected different distances above the bottoms of the sockets 23 including 0.64, 1.3, 1.6, 1.9 and 2.2 centimeters ($\frac{1}{4}$, $\frac{1}{2}$, $\frac{5}{8}$, $\frac{3}{4}$ and $\frac{7}{8}$ inch), all of which paint finishing pads 10 were about 20 centimeters (8 inches) in diameter, had thicknesses at the bottoms of the sockets 23 of about 0.64 centimeter ($\frac{1}{4}$ inch) and were made of Standard Convoluted "SCOTFOAM" P-80 obtained from Illbruck, and using a pad 20 centimeters (8 inches) in diameter and 2.5 centimeters (1 inch) thick of the same foam but having a flat surface by which the glaze was applied. The paint finishing pad 10 on which the projecting portions 16 of the layer 20 of foam projected 0.64 centimeter ($\frac{1}{4}$ inch) above the bottoms of the sockets 23 required a working time of 1 minute 42 seconds, produced an excellent swirl free surface, but when the painted surface was almost dry and the final gloss was near, had a slight tendency to grab the paint surface and cause vibration or chatter. The paint finishing pads 10 on which the projecting portions 16 of the layer 20 of foam projected greater than 0.64 centimeter (¼ inch) above the bottoms of the sockets 23 required shorter working times of about 1 minute 20 seconds, produced excellent swirl free surfaces which were almost as good as the surface produced by the foam in which the projecting portions 16 of the layer 20 of foam projected 0.64 centimeter (¼ inch) above the bottoms of the sockets 23, and had no tendency to grab the paint surface and cause vibration or chatter when the painted surface was almost dry and the final gloss was near. In contrast, the pad with the flat surface for applying the glaze required the longest working time of 2 minutes 5 seconds, could not remove all the swirls from the surface, and when the painted surface was almost dry and the final gloss was near, had a definite tendency to grab the paint surface and cause vibration or chatter.

Paint finishing pads 10 made of the Standard Convoluted "SCOTFOAM" P-80 obtained from Illbruck have also been tested for their ability to apply rubbing compound to remove the scratches that result from the color sanding operation, which tests have resulted in marginally acceptable results, and the belief that better results would be obtained if a stiffer foam was substituted for the foam tested.

The present invention has now been described with reference to one embodiment and several variations thereof. It will be apparent to those skilled in the art that many changes can be made in the embodiment described without departing from the scope of the present invention. Thus the scope of the present invention should not be limited to the structure described in this application, but only by structures described by the language of the claims and the equivalents of those structures.

We claim:

1. A pad for applying glaze to finish paint and adapted to be used on a drive assembly including a back up pad having a generally planar support surface and a drive motor for moving the back up pad in a plane parallel to said support surface during application of the glaze, said paint finishing pad comprising:

a layer of resiliently compressible open cell polymeric foam having a generally planar rear surface and an opposite front surface defined by a plurality of spaced projecting portions of said layer defining recess between said projecting portions, said polymeric foam from which said layer is formed having a compression deflection value of about 0.4 pounds per square inch when compressed twenty five percent and of about 0.65 pounds per square inch when compressed sixty five percent in accordance with the test procedure in ASTM D3574; and means attached to said rear surface for releasably attaching said paint finishing pad to the support surface of the drive unit.

2. A paint finishing pad according to claim 1 wherein said projecting portions of said layer of foam are disposed in a regular rectangular array, said layer has ridge portions recessed a first distance from the distal ends of said projecting portions, and said layer has a rectangular array of sockets recessed a second distance greater than said first distance from the distal ends of said projecting portions, with each of said sockets being bounded by the ridges between four adjacent projecting portions.

3. A paint finishing pad according to claim 2 wherein said second distance is more than about 0.64 centimeter (0.25 inch).

4. A paint finishing pad according to claim 1 wherein said projecting portions of said layer project more than about 0.64 centimeter (0.25 inch) beyond the recesses defined between said projecting portions.

5. A paint finishing pad according to claim 1 wherein said means attached to said rear surface for releasably attaching said paint finishing pad to the support surface of the drive unit comprises an attachment layer including a plurality of loops, and means for attaching said attachment layer to said layer of foam providing passageways between the attachment layer and the layer of foam that afford passage of liquid therebetween to facilitate cleaning of the paint finishing pad.

6. In combination, a drive assembly including a back up pad having a generally planar support surface and a drive motor for moving the back up pad in a plane parallel to said support surface, a pad for applying glaze to finish paint and comprising a layer of open cell resiliently compressible polymeric foam having a generally planar rear surface and an opposite front surface defined by a plurality of spaced projecting portions of said layer defining recess between said projecting portions, said polymeric foam from which said layer is formed having a compression deflection value of about 0.4 pounds per square inch when compressed twenty five percent and of about 0.65 pounds per square inch when compressed sixty five percent in accordance with the test procedure in ASTM D3574; and means for attaching the rear surface of said paint finishing pad to the support surface of the back up pad.

7. A combination according to claim 6 wherein said projecting portions of said layer are disposed in a regular rectangular array, said layer has ridge portions recessed a first distance from the distal ends of said projecting portions and extending between adjacent projecting portions, and said layer has a rectangular array of sockets recessed a second distance greater than said first distance from the distal ends of said projecting portions, with each of said sockets being bounded by the ridges between four adjacent projecting portions.

8. A combination according to claim 7 wherein said second distance is more than about 0.64 centimeter (0.25 inch).

9. A combination according to claim 6 wherein said projecting portions of said layer project more than about 0.64 centimeter (0.25 inch) beyond the recesses defined between said projecting portions.

10. A combination according to claim 6 wherein said means for attaching comprises a layer of material adhered to the rear surface of said layer of foam and having a plurality of projecting loops, and a layer along said support surface having a plurality of projecting hooks releasably engaging the loops on said layer of material.

11. A combination according to claim 6 wherein said means attached to said rear surface for releasably attaching said paint finishing pad to the support surface of the drive unit comprises an attachment layer including a plurality of loops, means for attaching said attachment layer to said layer of foam providing passageways between the attachment layer and the layer of foam that aford passage of liquid therebetween to facilitate cleaning of the paint finishing pad, and a layer along said support surface having a plurality of projecting hooks releasably engaging said loops.

12. In combination, a rotary drive assembly including a back up pad having a generally planar support surface and a drive motor for rotating the back up pad about a central axis normal to said support surface, a pad for applying glaze to finish paint and comprising a layer of resiliently compressible open cell polymeric foam having a generally planar rear surface and an opposite front surface defined by a plurality of spaced projecting portions of said layer defining recess between said projecting portions, said polymeric foam from which said layer is formed having a compression deflection value of about 0.4 pounds per square inch when compressed twenty five percent and of about 0.65 pounds per square inch when compressed sixty five percent in accordance with the test procedure in ASTM D3574; and means for attaching the rear surface of said paint finishing pad to the support surface of the back up pad.

13. A combination according to claim 12 wherein said projecting portions of said layer are disposed in a regular rectangular array, said layer has ridge portions recessed a first distance from the distal ends of said projecting portions and extending between adjacent projecting portions, and said layer has a rectangular array of sockets recessed a second distance greater than said first distance from the distal ends of said projecting portions, with each of said sockets being bounded by the ridges between four adjacent projecting portions.

14. A combination according to claim 13 wherein said second distance is more than about 0.64 centimeter (0.25 inch).

15. A combination according to claim 12 wherein said projecting portions of said layer project more than about 0.64 centimeter (0.25 inch) beyond the recesses defined between said projecting portions.

16. A combination according to claim 12 wherein said means for attaching comprises a layer of material adhered to the rear surface of said layer of foam and having a plurality of projecting loops, and a layer along said support surface having a plurality of projecting hooks releasably engaging the loops on said layer of material.

17. A combination according to claim 12 wherein said means attached to said rear surface for releasably attaching said paint finishing pad to be support surface of the drive unit comprises an attachment layer including a plurality of loops, means for attaching said attachment layer to said layer of foam providing passageways between the attachment layer and the layer of foam that afford passage of liquid therebetween to facilitate cleaning of the paint finishing pad, and a layer along said support surface having a plurality of projecting hooks releasably engaging said loops.

*18. A pad for applying glaze to finish paint and adapted to be used on a drive assembly including a back up pad having a generally planar support surface and a drive motor for moving the back up pad in a plane parallel to said support surface during application of the glaze, said paint finishing pad comprising:*

*a layer of resiliently compressible open cell polymeric foam having a generally planar rear surface and an opposite front surface defined by a plurality of spaced projecting portions of said layer defining recess between said projecting portions, said polymeric foam from which said layer is formed having a compression deflection value generally in the range of about 0.29 to 0.49 pounds per square inch when compressed twenty five percent and generally in the range of about 0.43 to 0.77 pounds per square inch when compressed sixty five percent in accordance with the test procedure in ASTM D3574; and*

*means attached to said rear surface for releasably attaching said paint finishing pad to the support surface of the drive unit.*

*19. A paint finishing pad according to claim 18 wherein said projecting portions of said layer of foam are disposed in a regular rectangular array, said layer has ridge portions recessed a first distance from the distal ends of said projecting portions and extending between adjacent projecting portions, and said layer has a rectangular array of sockets recessed a second distance greater than said first distance from the distal ends of said projecting portions, with each of said sockets being bounded by the ridges between four adjacent projecting portions.*

*20. A paint finishing pad according to claim 18 wherein said projecting portions of said layer project more than about 0.64 centimeter (0.25 inch) beyond the recesses defined between said projecting portions.*

*21. A paint finishing pad according to claim 19 wherein said second distance is more than about 0.64 centimeter (0.25 inch ).*

*22. A paint finishing pad according to claim 18 wherein said means attached to said rear surface for releasably attaching said paint finishing pad to the support surface of the drive unit comprises an attachment layer including a plurality of loops, and means for attaching said attachment layer to said layer of foam providing passageways between the attachment layer and the layer of foam that afford passage of liquid therebetween to facilitate cleaning of the paint finishing pad.*

*23. In combination,*

*a rotary drive assembly including a back up pad having a generally planar support surface and a drive motor for rotating the back up pad about a central axis normal to said support surface,*

*a pad for applying glaze to finish paint and comprising a layer of resiliently compressible open cell polymeric foam having a generally planar rear surface and an opposite front surface defined by a plurality of spaced projecting portions of said layer defining recess between said projecting portions, said polymeric foam from which said layer is formed having a compression deflection value generally in the range of about 0.29 to 0.49 pounds per square inch when compressed twenty five percent and generally in the range of about 0.43 to 0.77 pounds per square inch when compressed sixty five percent in accordance with the test procedure in ASTM D3574; and*

*means for attaching the rear surface of said paint finishing pad to the support surface of the back up pad.*

*24. A combination according to claim 23 wherein said projecting portions of said layer are disposed in a regular rectangular array, said layer has ridge portions recessed a first distance from the distal ends of said projecting portions and extending between adjacent projecting portions, and said layer has a rectangular array of sockets recessed a second distance greater than said first distance from the distal ends of said projecting portions, with each of said sockets being bounded by the ridges between four adjacent projecting portions.*

*25. A combination according to claim 23 wherein said projecting portions of said layer project more than about 0.64 centimeter (0.25 inch) beyond the recesses defined between said projecting portions.*

*26. A combination according to claim 24 wherein said second distance is more than about 0.64 centimeter (0.25 inch).*

*27. A combination according to claim 23 wherein said means for attaching comprises a layer of material adhered to the rear surface of said layer of foam and having a plurality of projecting loops, and a layer along said support surface having a plurality of projecting hooks releasably engaging the loops on said layer of material.*

*28. A combination according to claim 23 wherein said means attached to said rear surface for releasably attaching said paint finishing pad to the support surface of the drive unit comprises an attachment layer including a plurality of loops, means for attaching said attachment layer to said layer of foam providing passageways between the attachment layer and the layer of foam that afford passage of liquid therebetween to facilitate cleaning of the paint finishing pad, and a layer along said support surface having a plurality of projecting hooks releasably engaging said loops.*

* * * * *